Jan. 25, 1938. G. CHRISTENSON 2,106,293
PACKING MATERIAL AND ASSEMBLY
Filed Jan. 23, 1934
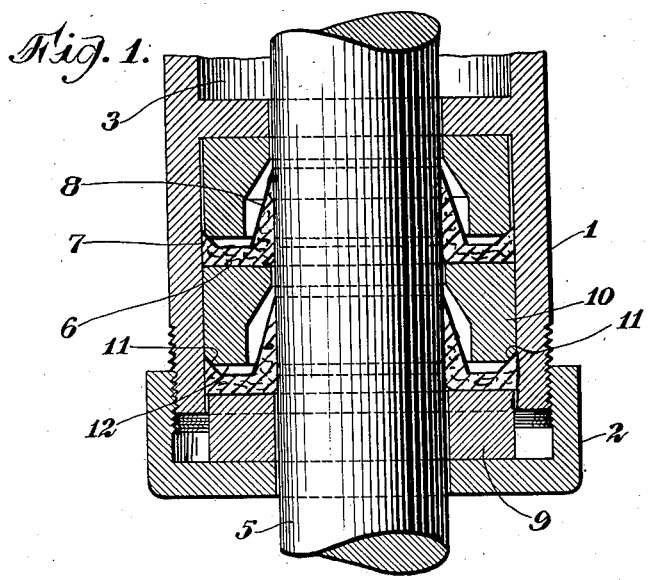
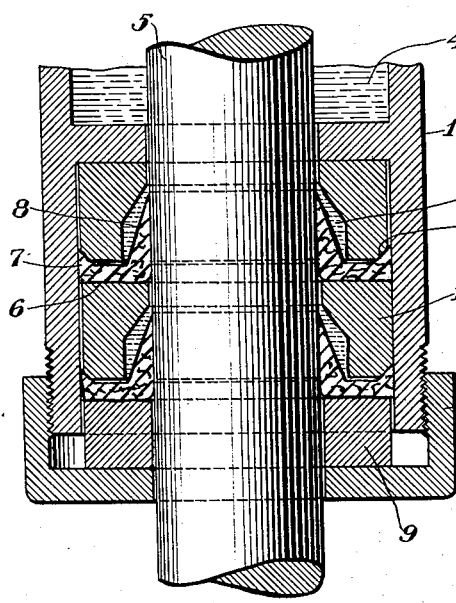
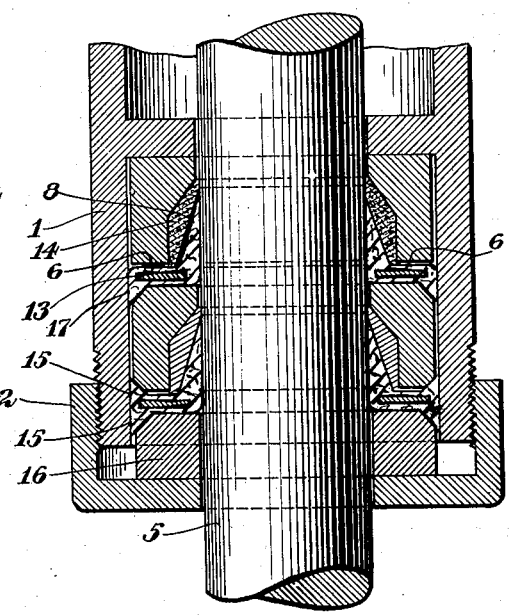
INVENTOR.
George Christenson.
BY D. N. Halstead
ATTORNEY.

Patented Jan. 25, 1938

2,106,293

UNITED STATES PATENT OFFICE

2,106,293

PACKING MATERIAL AND ASSEMBLY

George Christenson, Plainfield, N. J., assignor to Johns-Manville Corporation, New York, N. Y., a corporation of New York Application January 23, 1934, Serial No. 707,871

3 Claims. (Cl. 286—26)

This invention relates to a packing assembly and packing member adapted for use therein.

There is need of a packing assembly which is adapted to withstand a severe sudden change of fluid pressure without leakage of fluid through the assembly. In the hydraulic shock absorbers of an airplane strut, for example, there is momentarily a very high pressure on the hydraulic medium when the airplane, in landing, causes the strut to strike the ground. The shock absorber, of which the new packing assembly is adapted to form a part, may comprise a usual type of hydraulic absorber in which fluid is present in a chamber provided with a piston with a head having outlet means for the escape of oil in a regulated manner as the pressure of landing is applied to the oil. In the packing of the piston to avoid escape of fluid from the chamber too rapidly, and in a manner other than through the outlet means provided for that purpose, it is necessary to use a type of packing and packing assembly in which undesired leakage of oil is minimized, even under very high pressure, and in which the packing material does not undergo excessive distortion.

It is an object of the invention to provide a packing structure meeting these requirements. Other objects and advantages of the invention will appear from the following description and the appended claims.

A preferred embodiment of the invention is illustrated in the drawing in which

Fig. 1 shows a longitudinal sectional view of the packing assembly, before the assembly is tightened;

Fig. 2 shows a similar view of the assembly of Fig. 1 after being tightened; and Fig. 3 shows an assembly of a similar structure embodying certain modifications.

In the several figures, like reference characters denote like parts.

There are shown a rigid outer member 1 and gland nut 2, suitably of strong metal, constituting jointly a stuffing box, in connection with a chamber 3, holding a fluid medium 4, such as shock absorber oil, and being a part of a shock absorber of usual type. Other parts of the shock absorber are not shown, inasmuch as they may be conventional and they form no part of the present invention.

Within the stuffing box is the inner member 5, as, for example, a movable piston that it is desired to pack. The members 1 and 5 may be circular in cross section and define between them a space that is annular. Disposed within this space is the improved type of packing member comprising a web element, suitably, a stiff body portion 6 and flanges 7 and 8 extending laterally, as shown, as, for instance, from opposite side edges of the said body portion. These flanges are integral with the body portion, are of the nature of flexible lips for affording packing contact, respectively, with the inner surface of the outer member 1 and the outer surface of the inner member 5, and are suitably tapered each to a pointed terminal edge, whereby the flexibility of the lips is caused to increase, progressively, with the distance from the base or position of union with the body portion 6, to the said edge. The material of construction of the packing member may be conventional packing material adapted for withstanding exposure to oil and other conditions prevailing in the assembly. Thus, there may be used composited heavily rubberized fabric or rubber compound containing reenforcing fibers of asbestos or the like distributed therethroughout. Such a composited article that has been used satisfactorily has an overall width of 0.75 inch, a thickness of base portion of approximately 0.2 inch, and upstanding lips that may be of a height above the base of the web member equal approximately to 0.9 inch for the lip contacting with the inner member, and 0.4 inch for the lip contacting with the outer member. Compositions of fabric or fabric-reenforced polymerized chloroprene, initially of approximately the consistency of rubber, are particularly satisfactory when the packing member must withstand contact with oil. The proportion of reenforcing fabric or fibers in the stiff web portion is suitably greater than in the more flexible lip portions, particularly than in the edge portions of the lips.

The gland nut 2, as it is screwed into the tightening position, may act upon a rigid ring member 9 that supports the packing member at one end of the packing assembly. Disposed on the other side of the packing member, that is, in the direction of extension of the lips, is a rigid filler member 10 of metal or the like, as, for example, a light metal of the type of aluminum, adapted to force the lip on the outer edge of the packing member into packing contact with the inner surface of the member 1. There is obtained thus thorough contact of the lip, over a substantial area of its outer surface, with the member to be packed.

With the use of this metal filler and with the nature of the contact obtained thereby, leakage that had been previously experienced, around the outer edge of the packing and immediately inside the stuffing box, is minimized. Furthermore, this minimizing of leakage is obtained with the use of a relatively thin packing member, as illustrated by the typical dimensions given above, and so there is avoided the danger of development of looseness in the structure, due to excessive change of volume that might be experienced, under the influence of oft repeated severe pressure, if the packing member were very thick. On the other hand, the tightening action of the metal filler and the blunt end 12 thereof serve to maintain the packing in position under the most severe conditions of use.

When the packing assembly is in use, with the hydraulic shock absorber operating, for instance, on oil, there is a small and desirable seepage of oil 4 into the packing assembly. Then, as pressure is applied, in a direction opposite to the direction of extent of the flanges, that would be in a downwardly direction for the structure as illustrated in Fig. 2, the pneumatic pressure on the oil causes sealing contact of the longer upstanding flanges 8 against the piston member 5. At the same time the filler members 10, each in tight engagement with a packing member in the assembly of a plurality of such packing units, seal the outer edges of the packing against any substantial leakage between the packing and the stuffing box. The result is a very effective and convenient arrangement. The sealing effectiveness is increased by the shoulder being sloped, as shown at 11, in a direction extending inwardly, in the direction of the packing, and adapted to be forced inside the lip 7, to conform approximately to the slope thereof, and to spread the lip outwardly into packing contact with the member 1.

In the modification shown in Fig. 3 the shape of the stiff web portion of the packing and, therefore, the position of the bases of the upstanding lips also are established more definitely by means of a rigid reenforcing element 13 of the type of metal washers disposed within the semi-rigid material, say, of the type of fiber- or fabric-reenforced rubber compound, constituting the web portion of the packing. Also, the thoroughness of contact of the longer upstanding lip 8 may be established by a yieldable filler element 14 forcing this lip inwardly into contact with the member 5. This filler should be constructed of more resilient and more readily yieldable material than the lip 8. Thus, the resilient filler may be a relatively soft polymerized or vulcanized chloroprene or rubber compound, preferably free from such stiffening ingredients as fibers.

The unequal width of the lips adapts the wider one to be held adequately in packing contact by the pressure of a fluid or a yieldable filler element, while the shorter lip, held satisfactorily by the rigid filler, is economical of space in the assembly as well as materials of construction.

There have been described above packing members in which the flanges constituting the lips extend in approximately parallel directions, that is, so that the outer surfaces of the two lips are adapted to be spread apart and to pack two spaced parallel surfaces. These flanges extend laterally, as stated, suitably at approximately a right angle as measured between the outer surfaces of the lips and the plane of the stiff web portion. In the modification shown in Fig. 3, in connection with the lower of the two packing members, there are two flanges 15, on the same side edge of the packing member, that extend in approximately opposite directions, each flange or lip being held in packing contact with the inside of the member 1 by means of sloped shoulders of either a rigid metal filler member of type described or the oppositely disposed ring element 16. Also, there are shown in Fig. 3, in connection with the illustration of the upper packing member, a packing member of modified Z-shape in which the flanges or lips on the two opposed sides of the stiff central web portion of the packing member extend in approximately opposite directions, the inner lip, as illustrated, extending upwardly and the outer lip 17 extending downwardly. This adapts the outer edge of the packing member to seal against passage of oil under pressure in either direction.

It will be understood that the details that have been given are for the purpose of illustration, not restriction, and that variations within the scope of the appended claims may be made without departing from the spirit of the invention.

What I claim is:

1. A packing assembly comprising, in combination, a member of the type of a stuffing box provided with an inner surface to be packed; a member of the type of a cylindrical piston movable within the outer member, defining therewith a space adapted to receive packing material, and provided with an outer surface to be packed; a packing member disposed within the said space and having a stiff metal-reenforced body portion, a portion contacting with the said outer surface, and a flexible upstanding lip integrally united to the said body portion at the outer edge thereof; and an independently movable rigid filler member disposed within the said space and adapted to be forced inside the said lip and to deflect it outwardly into packing contact with the said inner surface.

2. A packing member of the type described comprising a web element, two flanges extending in opposite directions from one side of the web element, and a flange extending from the other side of the said element.

3. A packing assembly comprising rigid members to be packed, a packing member, of the type described, including a web element, flexible lips extending from opposite edges of the web element, a rigid filler element contacting with and holding one of the lips in packing contact with a surface of one of the said members to be packed, and a yieldable, resilient, solid filler element contacting with the said rigid filler element and forcing the other of the said lips into packing contact with the surface of the other of the members to be packed.

GEORGE CHRISTENSON.